(12) United States Patent
Soliman et al.

(10) Patent No.: US 7,722,499 B2
(45) Date of Patent: May 25, 2010

(54) LAUNCH CONTROL OF A HYBRID ELECTRIC VEHICLE

(75) Inventors: Ihab S. Soliman, Warren, MI (US); Andrew J. Silveri, Royal Oak, MI (US); Deepak Aswani, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 607 days.

(21) Appl. No.: 11/810,750

(22) Filed: Jun. 7, 2007

(65) Prior Publication Data
US 2008/0305925 A1    Dec. 11, 2008

(51) Int. Cl.
*B60W 10/02*    (2006.01)
(52) U.S. Cl. ............................ 477/5; 477/181
(58) Field of Classification Search ........................ 477/6
See application file for complete search history.

(56) References Cited

U.S. PATENT DOCUMENTS

| | | | |
|---|---|---|---|
| 6,319,168 B1 | 11/2001 | Morris et al. | |
| 6,726,593 B2 * | 4/2004 | Yamamoto et al. | 477/5 |
| 7,222,011 B2 * | 5/2007 | Smith et al. | 701/51 |
| 2003/0078136 A1 | 4/2003 | Yamaguchi et al. | |
| 2005/0155803 A1 | 7/2005 | Schiele | |
| 2005/0181907 A1 | 8/2005 | Colvin et al. | |

* cited by examiner

*Primary Examiner*—Roger L Pang
*Assistant Examiner*—Edwin A. Young
(74) *Attorney, Agent, or Firm*—David B. Kelley; MacMillan, Sobanski & Todd, LLC

(57) ABSTRACT

A method for controlling a vehicle launch using a transmission having an input, a current gear, an input clutch associated with a target gear and an output, an engine and an electric machine for driving the input, includes the steps of using the engine and the first electric machine to drive the transmission input at a desired magnitude of torque, determining a desired magnitude of torque capacity of the input clutch, determining a crankshaft speed error, determining a magnitude of a change in torque capacity of the input clutch that will reduce the crankshaft speed error, and increasing the torque capacity of the input clutch to a desired torque capacity whose magnitude is determined by adding the current magnitude of torque capacity of the input clutch and said change in torque capacity of the input clutch.

25 Claims, 7 Drawing Sheets

LAUNCH CONTROL OF A HYBRID ELECTRIC VEHICLE

BACKGROUND OF THE INVENTION

1. Field of the Invention

This invention relates generally to a powertrain for a hybrid electric vehicle having an engine and one or more electric machines and, in particular, to controlling torque transmitted to the drive wheels when the vehicle is being accelerated from a stopped or nearly stopped condition, called vehicle launch.

2. Description of the Prior Art

A powershift transmission is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle launch condition in a conventional vehicle whose powertrain includes a powershift transmission, the engine and transmission are concurrently controlled in a coordinated manner to provide acceptable vehicle launch performance. In a powershift transmission vehicle application, providing consistent and acceptable vehicle launch performance can be a rather difficult control problem due to the lack of a torque converter. During a vehicle launch condition in this type of vehicle application, the torque capacity of the transmission clutch and slip across the clutch are carefully controlled in coordination with the engine torque to provide the desired vehicle response. Problems which can occur during these events include engine stall, excessive clutch slip, reduced clutch durability, dead pedal feel, and inconsistent response are a few examples.

A powershift transmission may be used in a hybrid electric vehicle (HEV), in which one or more electric machines, such as a motor or an integrated starter-generator (ISG), are arranged in series and parallel with the engine. Unlike a conventional vehicle with a powershift transmission, in a hybrid electric vehicle with a powershift transmission, there are multiple propulsion paths and multiple power sources, the engine and electric machines, which can be used during a vehicle launch condition. Therefore, a more sophisticated powershift vehicle launch control system is needed to deal with the complexities and added powertrain operating modes of an HEV in response to a vehicle launch request from the vehicle operator.

SUMMARY OF THE INVENTION

The system and method for controlling vehicle launch in a HEV takes advantage of additional propulsion paths and torque actuators to improve vehicle launch performance and to overcome problems and deficiencies presented by a conventional vehicle with a powershift transmission.

This control strategy supports torque blending when multiple propulsion paths are used for propulsion during vehicle launch due to enhanced powershift transmission control. Moreover, the control coordinates clutch torque capacity control when propulsion assistance is provided by the additional torque actuators, which improves clutch durability since clutch load is reduced accordingly. Furthermore, the control supports battery charging by the first electric machine during vehicle launch conditions by controlling the net crankshaft torque accordingly. The control supports multiple HEV powertrain operating modes and transitions, automatically operates the same as a conventional vehicle with a powershift if the additional torque actuators are not used, and is applicable to any HEV powertrain architecture that employs a powershift transmission whether the input clutches are wet or dry clutches.

A powertrain to which the control of a vehicle launch may be applied includes a transmission having an input, a current gear, an input clutch associated with a target gear and an output, an engine and a first electric machine for driving the input. A method for controlling a vehicle launch using a transmission having an input, a current gear, an input clutch associated with a target gear and an output, an engine and an electric machine for driving the input, includes the steps of using the engine and the first electric machine to drive the transmission input at a desired magnitude of torque, determining a desired magnitude of torque capacity of the input clutch, determining a crankshaft speed error, determining a magnitude of a change in torque capacity of the input clutch that will reduce the crankshaft speed error, and increasing the torque capacity of the input clutch to a desired torque capacity whose magnitude is determined by adding the current magnitude of torque capacity of the input clutch and said change in torque capacity of the input clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
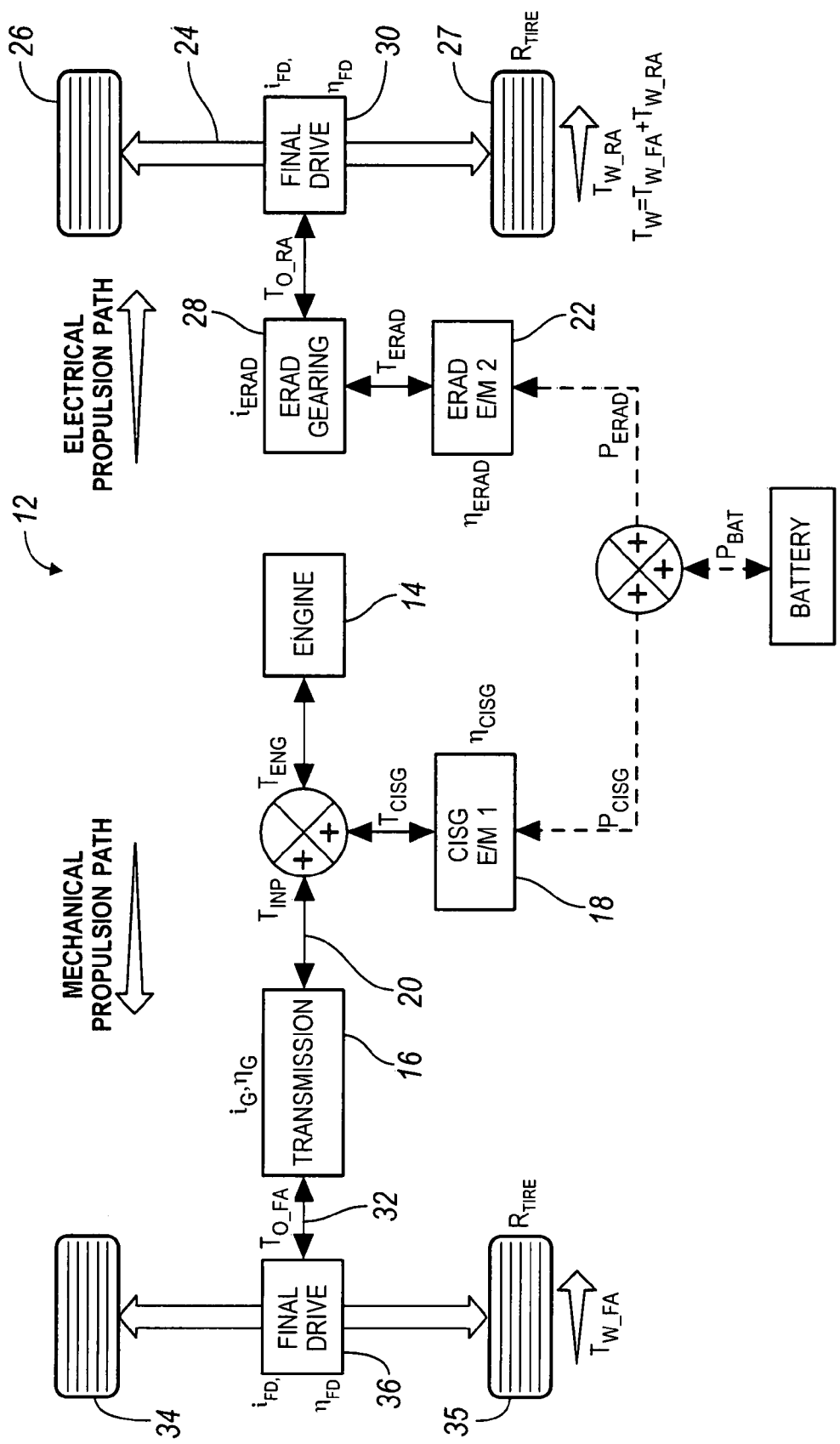
FIG. 1 is a schematic diagram of a vehicle powertrain system to which the control can be applied.
Figure 2:
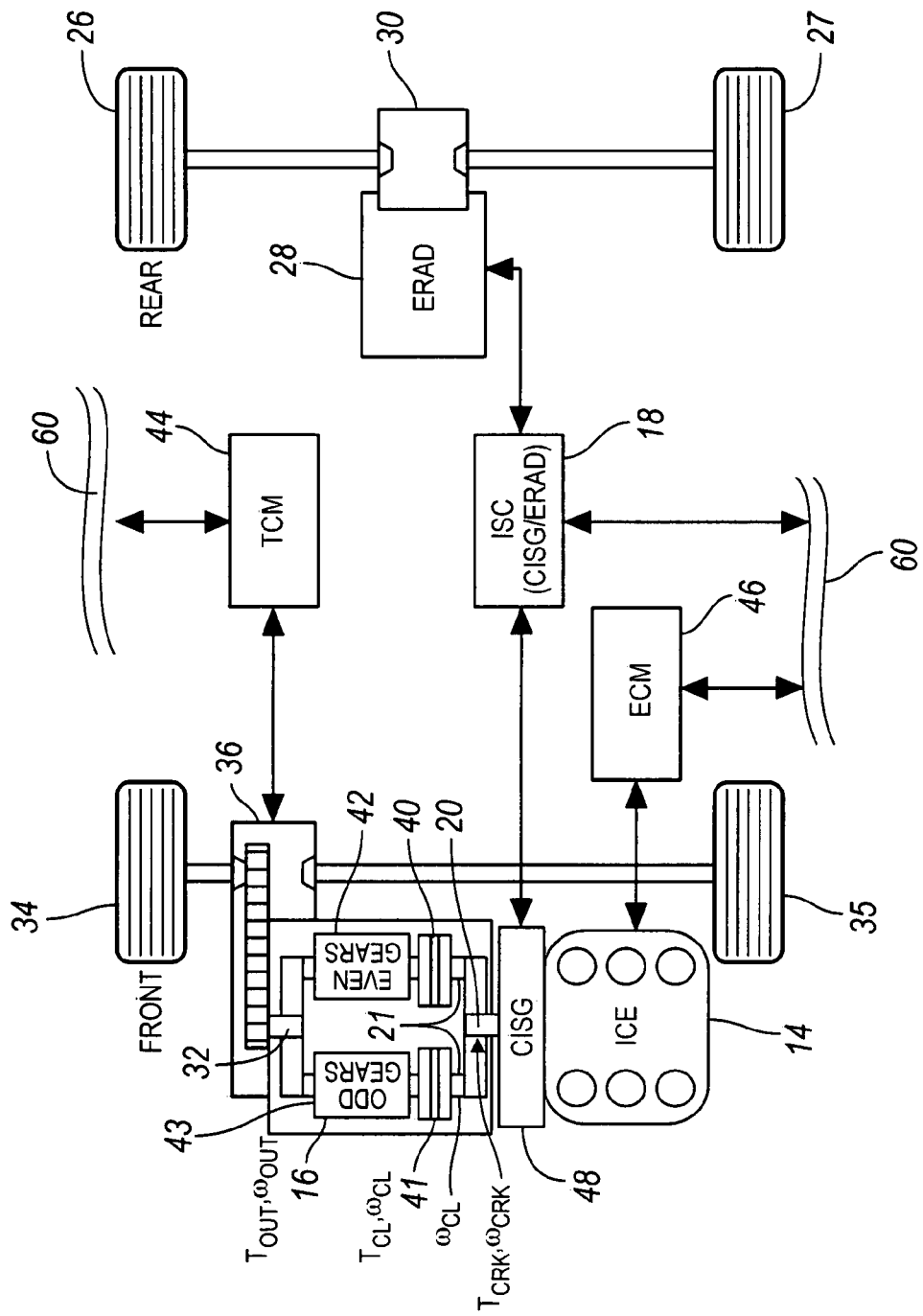
FIG. 2 is a schematic diagram showing additional details of the vehicle powertrain system of FIG. 1.

As shown in FIGS. 1 and 2, a vehicle powertrain 12 includes an engine 14, such as a diesel or gasoline engine; a transmission 16, such as a dual wet clutch powershift transmission or another multiple ratio transmission having no torque converter; an electric machine 18, such as an ISG (integrated starter generator) driveably connected to the transmission input 20; and an additional electric machine 22, such as an electric motor. Electric machine 18 provides starter/generator capability.

Electric machine 22, sometimes referred to as an electric rear axle drive unit (ERAD), is connected to the final drive of a rear axle 24 through gearing 28 and provides additional propulsion capability in either an electric drive or hybrid (series/parallel) drive mode. In full FWD applications, electric machine 22 could also connected to the final drive of a front axle at the output of the transmission, and would be referred to as an electric front axle drive (EFAD) unit. Power output by the electric machine 22 drives vehicle wheels 26, 27 through ERAD gearing 28 and a final drive unit 30, which is in the form of an inter-wheel differential mechanism. Similarly, the transmission output 32 is driveably (mechanically) connected to vehicle wheels 34, 35 through a final drive unit 36, which includes an inter-wheel differential mechanism.

Powertrain 12 can operate in major modes including: (1) series hybrid drive, in which engine 14 is running and producing combustion, CISG 18 is generating electric power, and ERAD 22 is alternately motoring and generating electric power; (2) engine drive, in which CISG 18 and ERAD 22 are both nonoperative and engine 14 is running, as in a conventional powertrain; (3) parallel hybrid drive, in which engine 14 is running, CISG 18 and/or ERAD 22 are operative to provide additional vehicle propulsion; (4) engine starting, in which CISG 18 is motoring to start the engine by driving the engine flywheel; and (5) engine stop, in which engine 14 is shut down. While operating in parallel hybrid drive mode, the powertrain can operate in several sub-modes including: (3.1) parallel hybrid drive 1, in which CISG 18 is shutdown, ERAD 22 is motoring and generating; (3.2) parallel hybrid drive 2, in which CISG 18 is motoring and ERAD 22 is shutdown; (3.3) parallel hybrid drive 3, in which (CISG 18 and ERAD 22 are motoring; and (3.4) parallel hybrid drive 4, in which CISG 18 is generating and ERAD 22 is alternatively shutdown, motoring and generating.

FIG. 2 illustrates the input clutches 40, 41, which selectively connect the input shaft 20 of transmission 16 alternately to the even-numbered gears 42 and odd-numbered gears 43; an electronic transmission control module (TCM) 44, which controls the input clutches and gearbox state through command signals to servos that actuate the input clutches and gearbox shift forks/synchronizers; an electronic engine control module (ECM) 46, which controls operation of engine 14; an ISC 48, which controls the CISG and ERAD operations. A vehicle control system (VCS), which is not shown, issues control commands to the TCM and ECM. Each of the VCS, TCM and ECM includes a microprocessor accessible to electronic memory and containing control algorithms expressed in computer code, which are executed repeatedly at frequent intervals.

There are two propulsion paths, a mechanical path and an electrical path, which are used to meet the propulsion demand produced by the vehicle operator. The engine 14 and CISG 18 can provide vehicle propulsion by transmitting torque through transmission 16 in the mechanical propulsion path to wheels 34, 35, and the ERAD machine 28 can provide vehicle propulsion directly in the electrical propulsion path to wheels 26, 27.

The vehicle launch control uses a torque-based control scheme to control the torque capacity of the transmission input clutches 40, 41 and engine crankshaft torque in response to an effective front axle propulsion demand produced by the vehicle operator during a launch condition.

Figure 3:
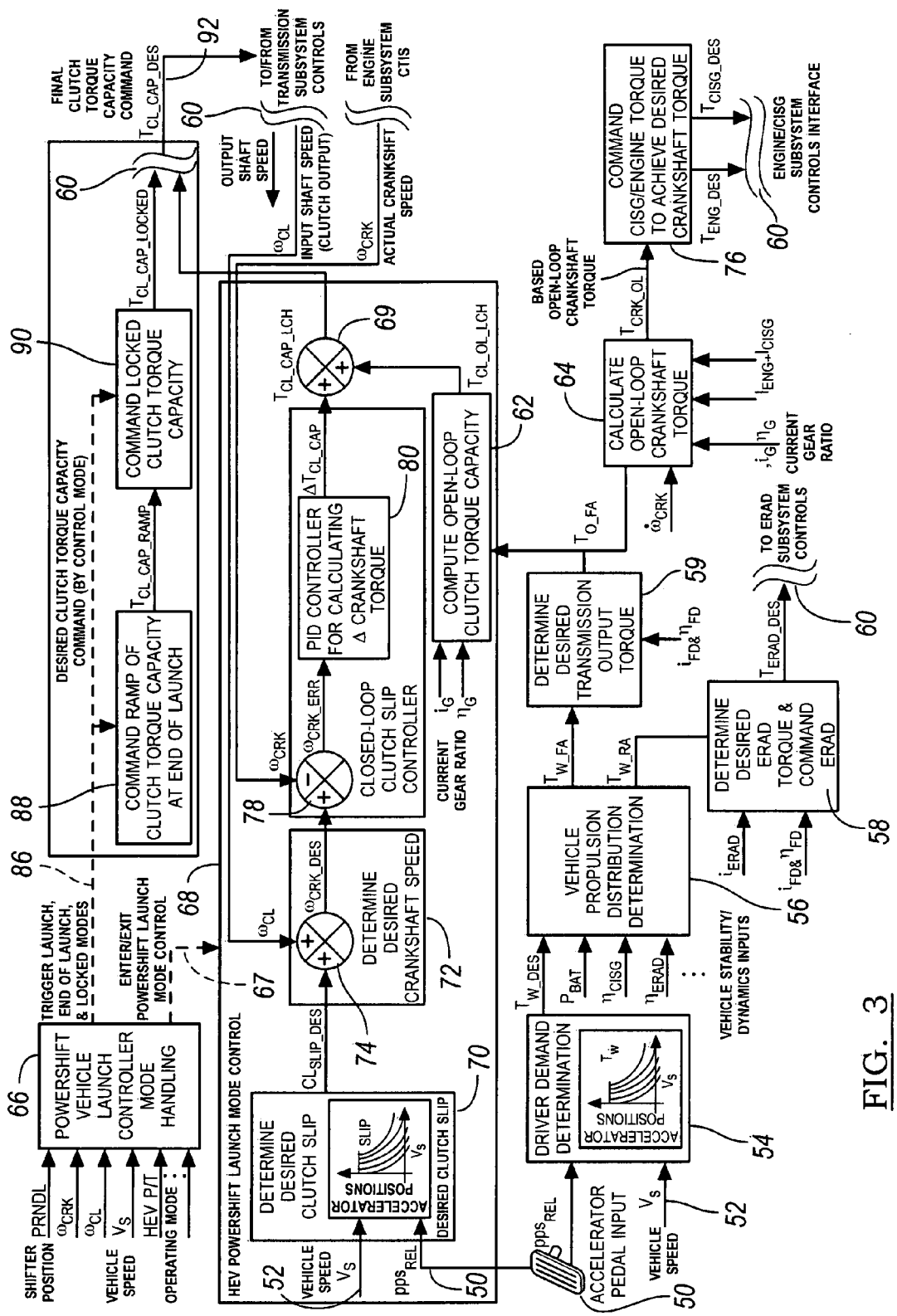
FIG. 3 is a schematic diagram of the vehicle launch control system.
Figure 4:
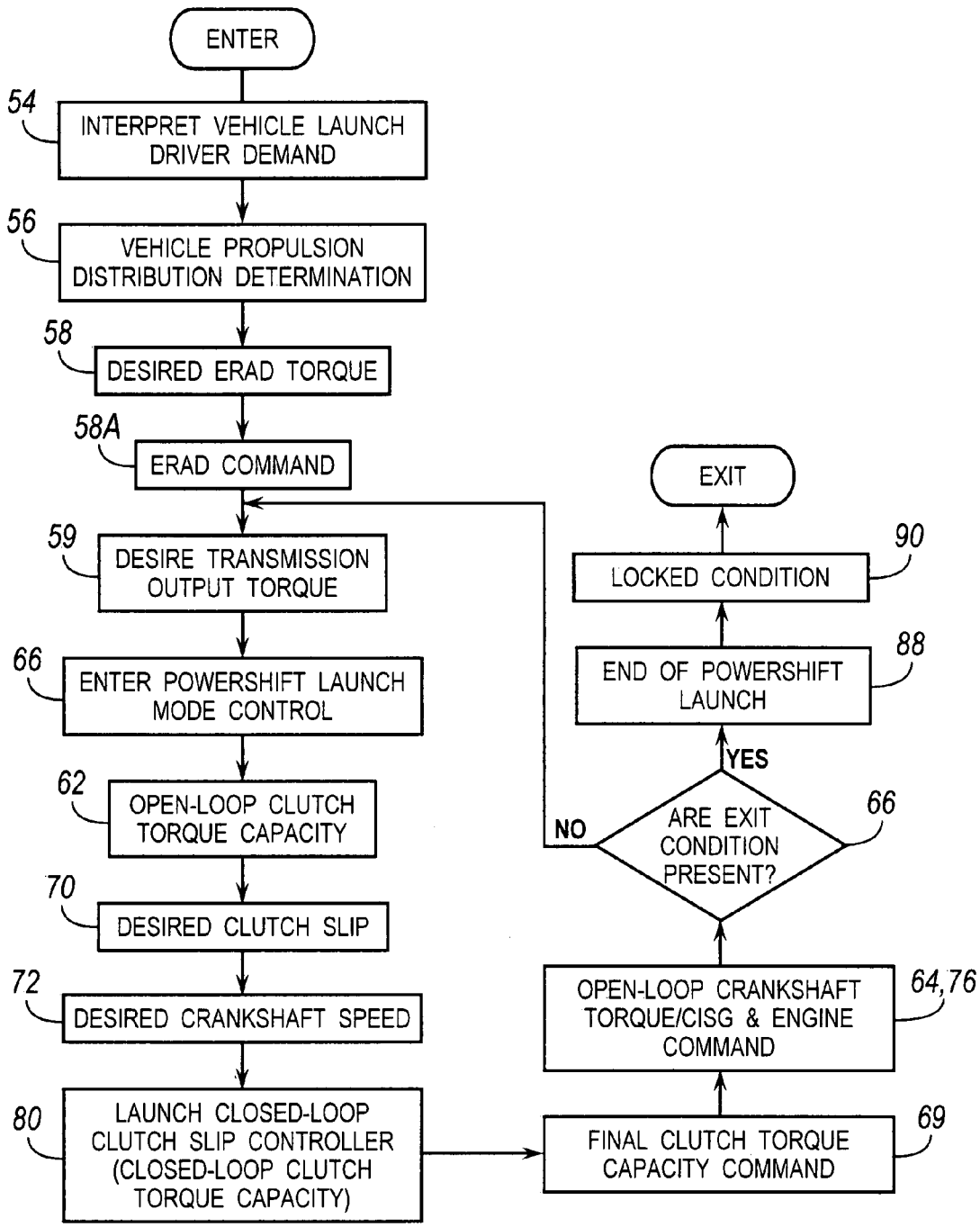
FIG. 4 is a diagram illustrating the vehicle launch control method steps.

The steps of an algorithm for controlling vehicle launch using the powertrain illustrated of FIGS. 1 and 2 are shown in the control system diagram of FIG. 3 and the method steps diagram of FIG. 4. The vehicle operator's demand for wheel torque is represented by the degree to which the engine accelerator pedal 50 is depressed, which depression is usually referred to as accelerator pedal position, pps. An electronic signal representing the accelerator pedal position produced by a pps sensor and an electronic signal representing the current vehicle speed 52 produced by a shaft speed sensor, are received as input by a driver demand determination function 54, which accesses in electronic memory a function indexed by the two input variables to produce the magnitude of the current desired wheel torque demand $T_{W\_DES}$.

At 56, the desired front axle torque $T_{W\_FA}$ to be provided to front wheels 34, 35 by the engine 14 and CISG 18 of the mechanical propulsion path and the desired rear axle torque $T_{W\_RA}$ to be provided to rear wheels 26, 27 by the ERAD 28 of the electrical propulsion path are determined upon reference to the desired magnitude of front axle torque and rear axle torque, such that the sum of the distributed propulsion torques equals the total driver demanded wheel torque $T_{W\_DES}$. The strategy for propulsion distribution may take into account vehicle stability and dynamics constraints, energy management and efficiency criteria, torque capabilities of the various power sources, etc.

At 58, the desired ERAD torque is determined, on reference to the distributed propulsion and the rear axle propulsion torque request $T_{W\_RA}$, and a command representing desired ERAD torque $T_{ERAD\_DES}$ is sent on communication bus 60 to the ISC 48 control interface, which command causes the ERAD 28 to produce the desired ERAD torque.

Similarly, at 59, the desired transmission output torque $T_{O\_FA}$ is determined and a command representing desired transmission output torque, determined with reference to the distributed propulsion and the front axle propulsion torque request $T_{W\_FA}$, is sent to 62, where input clutch torque capacity is determined, and to 64, where engine crankshaft torque is determined. Details of the techniques employed at 62 and 64 are described below.

Control then passes to a powershift mode handling controller 66, which receives input signals representing the position of the transmission gear selector PRNDL, actual crankshaft speed $\omega_{CRK}$ of engine 14, current clutch output speed $\omega_{CL}$ at the gearbox input 21, vehicle speed VS, and the HEV powertrain operating mode. Controller 66 activates a vehicle launch mode controller 68, provided the desired output torque $T_{O\_FA}$ is equal to or greater than a predetermined magnitude and vehicle speed is low, thereby indicating that the vehicle is operating in vehicle launch mode and that the propulsion path that includes transmission 16 will be used during vehicle launch.

After controller 66 issues command 67, which activates the launch mode control 68, control passes to 62 where an open-loop control determines the magnitude of a desired open-loop input clutch torque capacity $T_{CL\_OL\_LCH}$ on reference to the current transmission gear, its gear ratio, and the desired transmission output torque $T_{O\_FA}$.

The vehicle launch controller 68 determines at 70 the desired slip across the input clutch 40, 41 $CL_{SLIP\_DES}$ from a function stored in memory and indexed by the current vehicle speed VS and accelerator pedal position. The subject input clutch is associated with the target gear, i.e., the current transmission gear during launch.

At 72, the desired engine crankshaft speed $\omega_{CRK\_DES}$ at the transmission input 20 is determined at summing junction 74 with reference to the desired clutch slip $CL_{SLIP\_DES}$ and current clutch output speed, i.e., $\omega_{CL}$ at the gearbox input 21. The desired engine crankshaft speed $\omega_{CRK\ DES}$ is supplied as input to summing junction 78. A signal representing the current clutch output speed $\omega_{CL}$ is carried on communication bus 60 from the TCM 44 to summing junction 74.

At summing junction 78, the magnitude of engine crankshaft speed error $\omega_{CRK\_ERR}$, the difference between the desired engine crankshaft speed $\omega_{CRK\_DES}$ at the transmission input 20 and the current crankshaft speed $\omega_{CRK}$, is determined and supplied as input to a PID controller 80 or a similar closed loop controller. A signal representing the current crankshaft speed $\omega_{CRK}$ is carried on communication bus 60 from the ECM 46 to summing junction 78.

In order to control slip across the subject input clutch 40, 41 during vehicle launch, controller 80 determines a desired delta torque capacity of the subject input clutch $\Delta T_{CL\ CAP}$ that minimizes the current engine crankshaft speed error $\omega_{CRK\ ERR}$.

At summing junction 69 the desired torque capacity of the subject input clutch during launch $T_{CL\_CAP\_LCH}$, the sum of the desired delta torque capacity $\Delta T_{CL\ CAP}$ determined at 80 that minimizes the current engine crankshaft speed error $\omega_{CRK\ ERR}$ and the open loop torque capacity determined at 62 of the subject input clutch $T_{CL\_OL\_LCH}$, is determined and carried on bus 60 as the final input clutch torque capacity command 92 $T_{CL\_CAP\_DES}$ and sent to TCM 44, which produces a command signal that actuated the servo of the subject input clutch to produce the desired torque capacity.

Control then advances to 64, where the base torque $T_{CRK\_OL}$ carried by the engine crankshaft and transmission input 20 is determined open-loop upon reference to the desired transmission output torque $T_{O\_FA}$, current transmission gear, the current gear ratio, and expected inertial torque losses associated with the rate of change of engine crankshaft speed and combined inertias of the engine and CISG (i.e., torque lost due to engine and CISG acceleration during vehicle launch).

At 76, a command $T_{ENG\_DES}$ representing desired engine torque and a command $T_{CISG\_DES}$ representing desired CISG torque issue and are carried on communication bus 60 to an ECM 46 and to ISC 48 control interfaces. These commands adjust the engine torque and CISG torque to achieve the base crankshaft torque, such that the sum of the commanded engine torque and commanded CISG torque equals the base crankshaft torque $T_{CRK\_OL}$ from 64. The desired CISG torque can be commanded to charge the battery is the state of charge is low, and the desired engine torque can be increased accordingly such that the sum of both commands equal the base crankshaft torque.

Control then returns to 66 to determine whether the powershift vehicle launch mode control 68 should be deactivated based on the current conditions. If the current clutch slip $CL_{SLIP}$ is minimal, crankshaft speed $\omega_{CRK}$ is above the clutch output speed $\omega_{CL}$, and vehicle speed VS is above a threshold vehicle speed, then the vehicle launch mode control 68 is exited upon controller 66 issuing command signals 67 and 86.

Upon exiting vehicle launch mode control, controller 66 activates an end of launch mode at 88, where a command signal $T_{CL\ CAP\ RAMP}$ causes a gradual, smooth increase in torque capacity of the subject input clutch 40, 41 until the input clutch is engaged. While controller 66 activates 88 for smoothly engaging the input clutch at the end of launch, the command signal $T_{CL\_CAP\_RAMP}$ is sent to TCM 44 as the final input clutch torque capacity command 92.

After the subject input clutch 40,41 is smoothly engaged with zero clutch slip at 88, controller 66 activates a locked mode at 90 and a command $T_{CL\_CAP\_LOCKED}$ is produced and carried on the communication bus 60 to the TCM 44 as the final input clutch torque capacity command 92 $T_{CL\_CAP\_DES}$. After the subject input clutch 40, 41 is fully engaged, the command $T_{CL\_CAP\_LOCKED}$ issued by 90 causes the subject input clutch to become fully engaged or locked at a clutch torque capacity well above the current crankshaft torque magnitude, thereby ensuring that the transmission will not slip.

If any of the conditions required to exit the control vehicle launch control is absent, control returns to 59, where the subsequent steps of the control strategy are repeated.

FIG. 4 lists the steps of the vehicle launch control using the same reference numbers as are used in the sequence of steps described with reference to FIG. 3.

The graphs of FIG. 5A-5F show the variation with time of variables and parameters of the powertrain that are used or produced by executing the control algorithm. For example, FIG. 5A relates to wheel torques. At 100, the vehicle operator tips into the accelerator pedal during the neutral mode when neither input clutch 40, 41 is engaged, thereby increasing the desired wheel torque $T_{W\ DES}$ 104. The desired front axle torque 106 $T_{W\ FA}$ increases as vehicle propulsion is distributed, thereby initiating a vehicle launch condition beginning at 102. Desired wheel torque 104 $T_{W\ DES}$ and desired front axle torque 106 $T_{W\_FA}$ differ in magnitude by the magnitude of the desired rear axle torque 108 $T_{W\_RA}$. At 110, rear axle torque is blended out leaving only front axle torque to drive the vehicle during the vehicle launch mode.

Figure 5A:
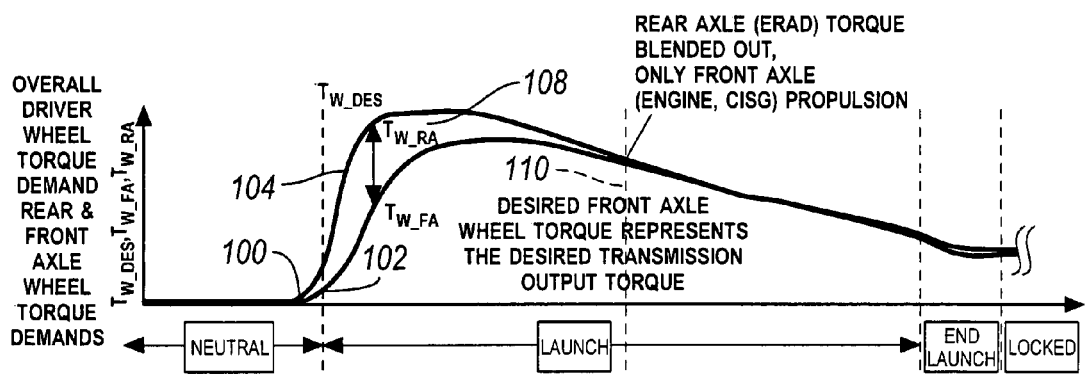
FIG. 5A is a graph showing the variation with time of desired wheel torques during vehicle launch operation produced by executing the control algorithm.
Figure 5B:
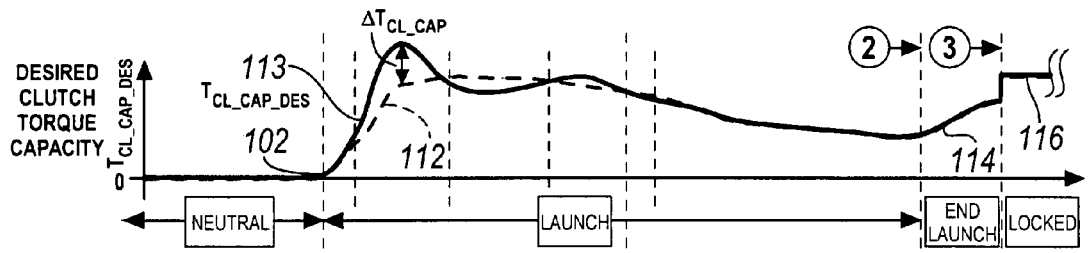
FIG. 5B is a graph showing the variation of the desired torque capacity of the subject input clutch with time during vehicle launch operation.

In FIG. 5B, at 102, the open-loop clutch torque capacity 112 $T_{CL\_OL\_LCH}$ is commanded during the vehicle launch mode based on desired transmission output torque $T_{O\_FA}$ FIG. 5B shows the variation of the final desired torque capacity 113 of the subject input clutch $T_{CL\ CAP\ DES}$ and the closed loop delta input clutch torque capacity $\Delta T_{CL\ CAP}$ located between graphs 112 and 113. At the end of the launch mode, the clutch torque capacity is ramped at 114 to smoothly engage the transmission. Once the clutch is engaged at the end of the launch mode, the torque capacity of the subject input clutch is stepped up and held at 116 to fully lock the clutch and ensure the input clutch does not slip.

Figure 5C:
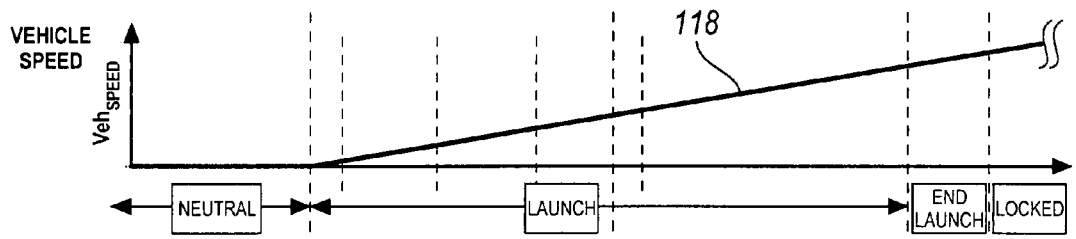
FIG. 5C is a graph showing the variation of vehicle speed with time during vehicle launch operation.

Vehicle speed 118, represented in FIG. 5C, is zero in the neutral mode, and increases throughout the launch mode.

Figure 5D:
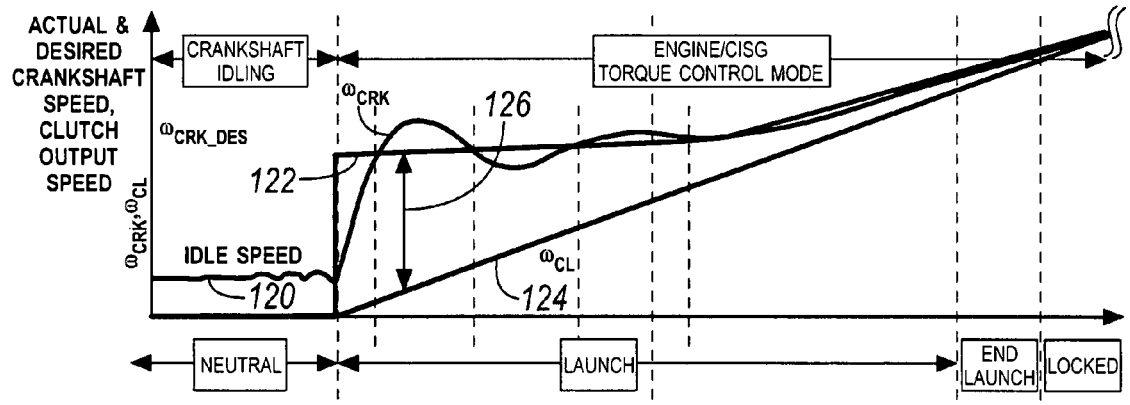
FIG. 5D is a graph showing the variation of engine crankshaft speed, desired engine crankshaft speed, and clutch output speed with time of wheel torques during vehicle launch operation.
Figure 5E:
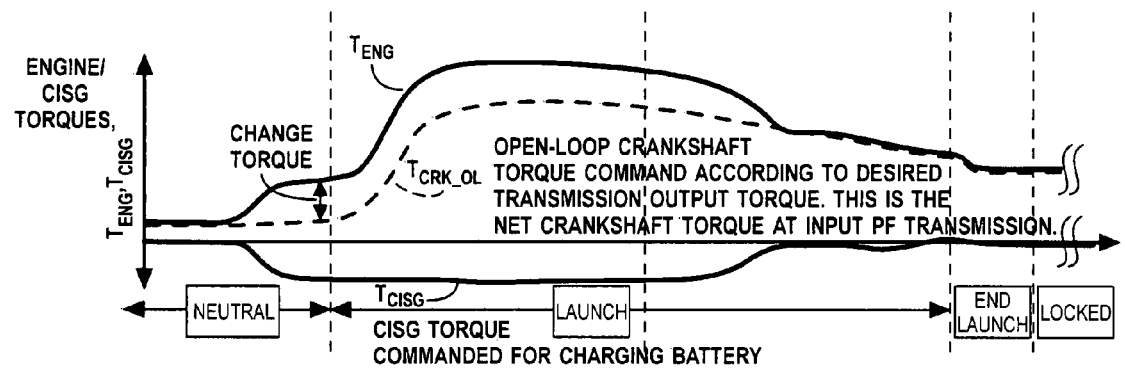
FIG. 5E is a graph showing the variation of engine torque and CISG torque with time during vehicle launch operation.

The variation of actual engine crankshaft speed 120, desired engine crankshaft speed 122, and clutch output speed 124 are represented in FIG. 5D. The desired slip across the subject input clutch is represented by the difference 126 between desired crankshaft speed 122 and clutch output speed 124. The control causes actual clutch slip to approach the desired clutch slip as actual crankshaft speed 120 is controlled to the desired crankshaft speed 122. The locations where actual crankshaft speed passes through desired crankshaft speed are shown by dashed vertical lines as shown in FIG. 5D.

Figure 5F:
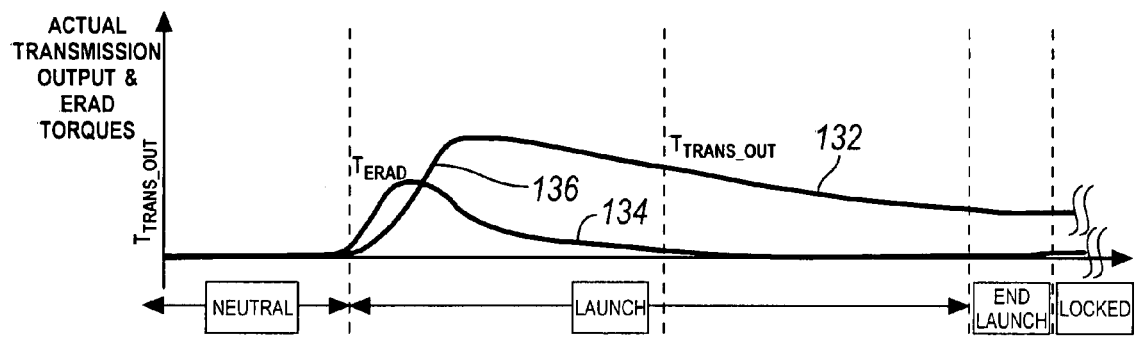
FIG. 5F is a graph showing the variation of transmission output torque and ERAD torque with time during vehicle launch operation.

Engine and CISG torques, are controlled such that the sum equals the desired open-loop crankshaft torque $T_{CRK\_OL}$ 128. The difference between the engine torque 80 and the open-loop crankshaft torque $T_{CRK\_OL}$ 128 represents the torque needed to charge the battery which is the CISG torque 130 since the CISG is producing generating torque to charge the battery. Essentially, the engine torque is increased to accommodate battery charging while still achieving the desired open-loop crankshaft torque. At the point where the battery is no longer charged, the CISG torque is zero and the engine torque equals the desired open-loop crankshaft torque $T_{CRK\_OL}$ 128, FIG. 5F illustrates the variation of transmission output torque 132 $T_{TRANS\_OUT}$ and ERAD torque 134 $T_{ERAD}$. The increase 136 in transmission output torque is due to increased clutch torque capacity 113, shown in FIG. 5B.

The effective propulsion request for the transmission propulsion path is the desired transmission output torque during a vehicle launch condition after propulsion distribution between both the mechanical and electrical paths has been determined. This approach compensates for any vehicle propulsion assistance provided by the ERAD during a vehicle launch condition since the overall vehicle propulsion request can be met by both the mechanical propulsion path and electrical propulsion path. In addition to supporting distributed propulsion, i.e. blending torque produced by the power sources, the clutch torque capacity is used to regulate clutch slip in coordination with CISG and engine torque control during the launch event.

Figure 6:
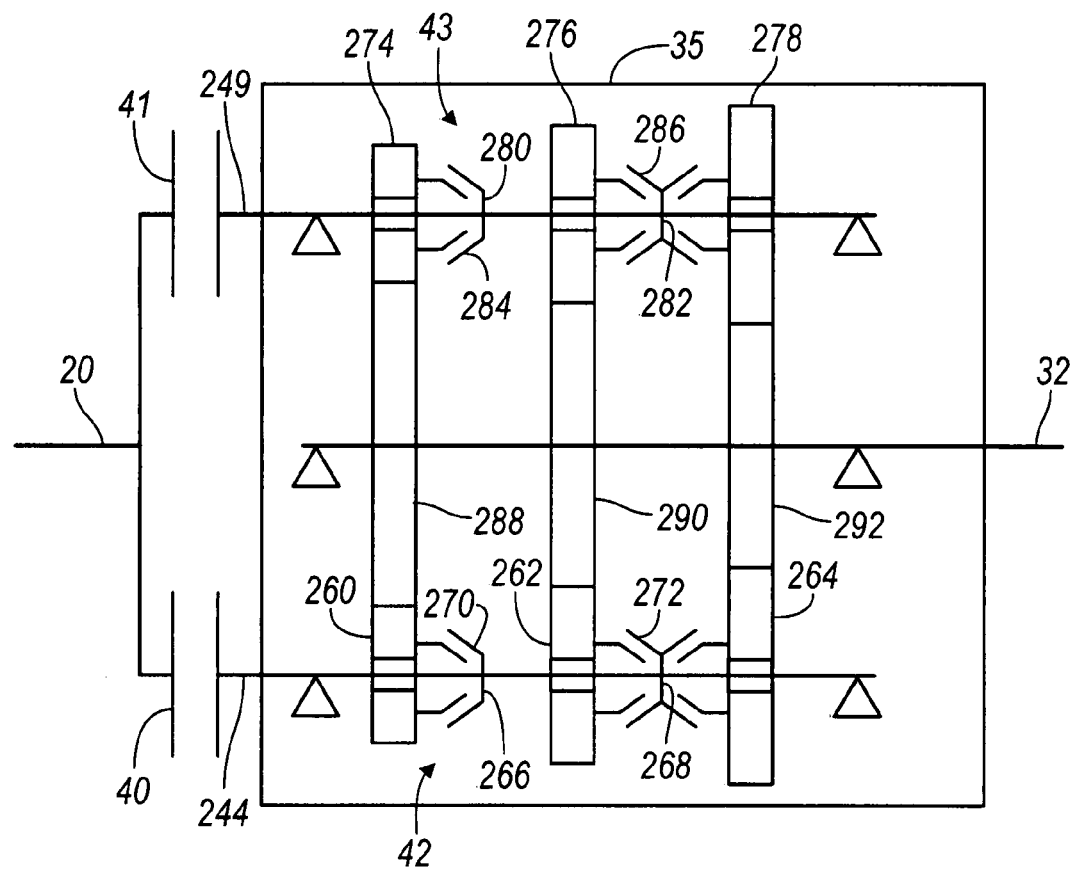
FIG. 6 is a schematic diagram showing details of a powershift transmission.

FIG. 6 illustrates details of a powershift transmission 16 including a first input clutch 40, which selective connects the input 20 of transmission 16 alternately to the even-numbered gears 42 associated with a first layshaft 244, and a second input clutch 41, which selective connects the input 20 alternately to the odd-numbered gears 43 associated with a second layshaft 249.

Layshaft 244 supports pinions 260, 262, 264, which are each journalled on shaft 244, and couplers 266, 268, which are secured to shaft 244. Pinions 260, 262, 264 are associated respectively with the second, fourth and sixth gears. Coupler 266 includes a sleeve 270, which can be moved leftward to engage pinion 260 and driveably connect pinion 260 to shaft 244. Coupler 268 includes a sleeve 272, which can be moved leftward to engage pinion 262 and driveably connect pinion 262 to shaft 244 and can be moved rightward to engage pinion 264 and driveably connect pinion 264 to shaft 244.

Layshaft 249 supports pinions 274, 276, 278, which are each journalled on shaft 249, and couplers 280, 282, which are secured to shaft 249. Pinions 274, 276, 278 are associated respectively with the first, third and fifth gears. Coupler 280 includes a sleeve 284, which can be moved leftward to engage pinion 274 and driveably connect pinion 274 to shaft 249. Coupler 282 includes a sleeve 286, which can be moved leftward to engage pinion 276 and driveably connect pinion 276 to shaft 249 and can be moved rightward to engage pinion 278 and driveably connect pinion 278 to shaft 249.

Transmission output 32 supports gears 288, 290, 292, which are each secured to shaft 32. Gear 288 meshes with pinions 260 and 274. Gear 290 meshes with pinions 262 and 276. Gear 292 meshes with pinions 264 and 278.

Couplers 266, 268, 280 and 282 may be synchronizers, or dog clutches or a combination of these.

Although the invention has been described with reference to a powershift transmission, the invention is applicable to any conventional manual transmission, automatic shift manual transmission, or automatic transmission that has no torque converter located in a power path between the engine and transmission input.

In accordance with the provisions of the patent statutes, the preferred embodiment has been described. However, it should be noted that the alternate embodiments can be practiced otherwise than as specifically illustrated and described.

What is claimed is:

1. A method for controlling a vehicle launch condition of a vehicle having a powertrain that includes a transmission having an input, a current gear, an input clutch associated with a target gear and an output, an engine and a first electric machine for driving the input, comprising the steps of:
  (a) using the engine and the first electric machine to drive the transmission input at a desired magnitude of torque;
  (b) determining a desired magnitude of torque capacity of the input clutch;
  (c) determining a crankshaft speed error;
  (d) determining a magnitude of a change in torque capacity of the input clutch that will reduce the crankshaft speed error; and
  (e) changing the torque capacity of the input clutch to a desired torque capacity whose magnitude is determined by adding the current magnitude of torque capacity of the input clutch and said change in torque capacity of the input clutch.

2. The method of claim 1 further comprising the step of using a speed of the vehicle and a position of an accelerator pedal to determine a vehicle propulsion demand.

3. The method of claim 1, wherein step (e) further comprises the step of increasing the torque capacity of the input clutch along a ramp to a torque capacity that is equal to the magnitude of torque at the transmission input.

4. The method of claim 1, wherein step (b) further comprises the steps of:
  using a speed of the vehicle and a position of an accelerator pedal to determine a desired magnitude of wheel torque; and
  using the desired magnitude of wheel torque and a gear ratio of the current gear to determine said desired torque capacity of the input clutch.

5. The method of claim 1, wherein step (a) further comprises the steps of:
  using a speed of the vehicle and a position of an accelerator pedal to determine a desired magnitude of wheel torque;
  using the desired magnitude of wheel torque, a gear ratio of the current gear, a rotating inertia of the engine, a rotating inertia of the first electric machine, and a rate of change of engine speed to determine said desired magnitude of torque at the transmission input.

6. The method of claim 1, wherein step (c) further comprises the steps of:
  determining a desired slip across the input clutch;
  using the desired slip across the input clutch and speed of the an output of the input clutch to determine desired crankshaft speed; and
  using a difference between the desired crankshaft speed and a speed of the crankshaft to determine the crankshaft speed error.

7. The method of claim 1 wherein step (d) further comprises the steps of using a PID controller and the crankshaft speed error to determine the desired change in torque capacity of the input clutch that will reduce the crankshaft speed error.

8. The method of claim 1 further comprising the steps of:
  determining whether input clutch slip is substantially zero;

determining whether the crankshaft speed is greater than the speed of the output of the input clutch;

determining whether the vehicle speed is greater than a predetermined vehicle speed; and discontinuing performing the vehicle launch control method, if all of said conditions are present.

9. A method for controlling a powertrain that includes a transmission having an input, a current gear, an input clutch associated with a target gear and an output, an engine and a first electric machine for driving the input and a first set of vehicle wheels, and a second electric machine for driving a second set of vehicle wheels, comprising the steps of:

(A) using an operator demand for a desired wheel torque to determine a desired wheel torque at the first wheel set and a desired wheel torque at the second wheel set;

(B) operating the engine, the first electric machine and the transmission to produce the desired magnitude of torque at the second wheel set, and operating the second electric machine to produce the desired magnitude of torque at the second wheel set;

(C) determining a desired magnitude of torque capacity of the input clutch;

(D) determining an crankshaft speed error;

(E) determining a magnitude of a change in torque capacity of the input clutch that will reduce the crankshaft speed error; and (F) changing the torque capacity of the input clutch to a desired torque capacity whose magnitude is determined by adding the current magnitude of torque capacity of the input clutch and said change in torque capacity of the input clutch.

10. The method of claim 9, wherein step (F) further comprises the step of increasing the torque capacity of the input clutch along a ramp to a torque capacity that is equal to the magnitude of torque at the transmission input.

11. The method of claim 9, wherein step (C) further comprises the steps of:

using a speed of the vehicle and a position of an accelerator pedal to determine a desired magnitude of torque at the transmission output; and using the desired magnitude of torque at the transmission output and a gear ratio of the current gear to determine said desired torque capacity of the input clutch.

12. The method of claim 9, wherein step (D) further comprises the steps of:

determining a desired slip across the input clutch;

using the desired slip across the input clutch and speed of an output of the input clutch to determine desired crankshaft speed; and using a difference between the desired crankshaft speed and a speed of the crankshaft to determine the crankshaft speed error.

13. The method of claim 12 further comprising the step of using a current vehicle speed and an accelerator pedal position to determine the desired slip across the input clutch.

14. The method of claim 9 wherein step (E) further comprises the steps of using a PID controller and the crankshaft speed error to determine the desired change in torque capacity of the input clutch that will reduce the crankshaft speed error.

15. The method of claim 9 further comprising the steps of:
determining whether input clutch slip is substantially zero;
determining whether the crankshaft speed is greater than the speed of the output of the input clutch;
determining whether the vehicle speed is greater than a predetermined vehicle speed; and
discontinuing performing the vehicle launch control method, if all of said conditions are present.

16. A system for controlling a vehicle launch condition comprising:

an engine;

a first electric machine;

a transmission including an input and an output, the transmission being able to operate in a current gear and a target gear;

an input clutch for alternately closing and opening a drive connection between the engine and transmission input and between the first machine and the transmission input; and a controller configured to drive the transmission input at a desired magnitude of torque, determine a desired magnitude of torque capacity of the input clutch, determine a crankshaft speed error, determine a magnitude of a change in torque capacity of the input clutch that will reduce the crankshaft speed error, and increase or decrease the torque capacity of the input clutch to a desired torque capacity whose magnitude is determined by adding the current magnitude of torque capacity of the input clutch and said change in torque capacity of the input clutch.

17. The system of claim 16, wherein the controller is further configured to increase the torque capacity of the input clutch along a ramp to a torque capacity that is equal to the magnitude of torque at the transmission input.

18. The system of claim 16, wherein the controller is further configured to:

use a speed of the vehicle and a position of an accelerator pedal to determine a desired magnitude of torque at the transmission output; and use the desired magnitude of torque at the transmission output and a gear ratio of the current gear to determine said desired torque capacity of the input clutch.

19. The system of claim 16, wherein the controller is further configured to:

determine a desired slip across the input clutch;

use the desired slip across the input clutch and speed of an output of the input clutch to determine a desired crankshaft speed; and use a difference between the desired crankshaft speed and a speed of the crankshaft to determine the crankshaft speed error.

20. A system for controlling a vehicle launch condition comprising:

an engine;

a first electric machine;

a second electric machine;

a transmission including an input and an output, the transmission being able to operate in a current gear and a target gear;

an input clutch for alternately closing and opening a drive connection between the engine and transmission input and between the first machine and the transmission input; and a controller configured to determine from an operator demand for a desired wheel torque a desired wheel torque at a first wheel set and a desired wheel torque a second wheel set; operate the engine, the first electric machine and the transmission to produce the desired magnitude of torque at the first wheel set, operate the second electric machine to produce the desired magnitude of torque at the second wheel set; drive the transmission input at a desired magnitude of torque, determine a desired magnitude of torque capacity of the input clutch; determine a crankshaft speed error; determine a magnitude of a change in torque capacity of the input clutch that will reduce the crankshaft speed error; and change the torque capacity of the input clutch to a desired torque capacity whose magnitude is determined by adding the current magnitude of torque capacity of the input clutch and said change in torque capacity of the input clutch.

21. The system of claim 20, wherein the controller is further configured to increase the torque capacity of the input clutch along a ramp to a torque capacity that is equal to the magnitude of torque at the transmission input.

22. The system of claim 20 wherein the controller is further configured to increase the torque capacity of the input clutch to a torque capacity that is greater than the magnitude of torque at the transmission input.

23. The system of claim 20, wherein the controller is further configured to:
   use a speed of the vehicle and a position of an accelerator pedal to determine a desired magnitude of torque at the transmission output; and
   use the desired magnitude of torque at the transmission output and a gear ratio of the current gear to determine said desired torque capacity of the input clutch.

24. The system of claim 20, wherein the controller is further configured to:
   use a speed of the vehicle and a position of an accelerator pedal to determine a desired magnitude of torque at the transmission output; and
   use the desired magnitude of torque at the transmission output, a gear ratio of the current gear, a rotating inertia of the engine, a rotating inertia of the first electric machine, and a rate of change of crankshaft speed to determine said desired magnitude of torque at the transmission input.

25. The system of claim 20, wherein the controller is further configured to:
   determine a desired slip across the input clutch;
   use the desired slip across the input clutch and speed of the an output of the input clutch to determine desired crankshaft speed; and
   use a difference between the desired crankshaft speed and a speed of the crankshaft to determine the crankshaft speed error.

* * * * *